United States Patent Office.

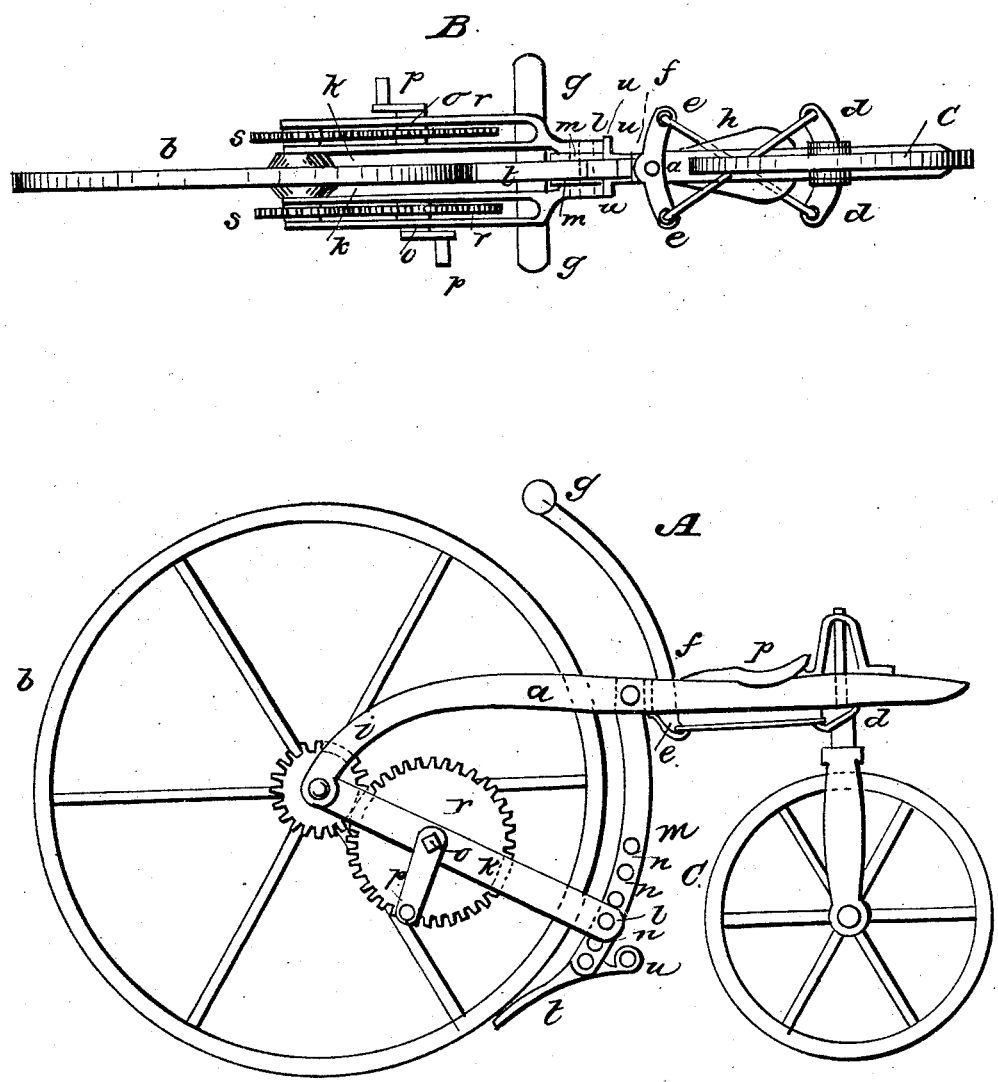

P. J. BORIS, OF BOSTON, MASSACHUSETTS.

Letters Patent No. 90,489, dated May 25, 1869.

IMPROVEMENT IN VELOCIPEDE

The Schedule referred to in these Letters Patent and making part of the same.

*To all whom it may concern:*

Be it known that I, P. J. BORIS, of Boston, in the county of Suffolk, and State of Massachusetts, have invented an Improved Velocipede; and I do hereby declare that the following, taken in connection with the drawings which accompany and form part of this specification, is a description of my invention, sufficient to enable those skilled in the art to practise it.

My invention relates principally to the construction of two-wheeled velocipedes, with particular reference to a provision for adapting the foot-driven cranks to persons of different lengths of legs, the invention being also applicable to velocipedes having more than two wheels.

In ordinary two-wheeled, or "Lallemont" velocipedes, the shaft of the main, or leader-wheel is cranked on each end, the rider sitting astride of the saddle, with a foot upon each crank-arm, and driving the wheel by alternate pressure upon the opposite cranks, but, in my construction, I place the foot-driven cranks upon the outer ends of an auxiliary shaft, journalled in an adjustable frame, which is hung and turns at one end upon the axle of the main wheel, and is secured at its opposite or rear end at any desirable distance below the perch, the distance of the cranks from the perch-saddle being made greater or less, by lowering or raising the frame of the crank-shafts.

The crank-shafts are geared to the main axle, and motion imparted by the feet to the cranks is transmitted through the gears to the leader-wheel. It is in this construction that my invention primarily consists.

The drawings represent a velocipede embodying the improvement.

A shows a side elevation of the machine.

B is a bottom view of it.

*a* denotes the perch.

*b*, the leader-wheel, the axle of which turns in bearings in the fork of the perch.

*c* denotes the rear wheel, which in this machine I make the steering-wheel, or rudder, the vertical spindle, or shaft, (which is bifurcated to form the bearings for the axial journals thereof,) extending up through and turning in the perch, and the spindle having projecting from it two arms, *d*, each connected at its outer end to one end of a lever, *e*, at the foot of a vertical shaft, *f*, journalled in the perch, the upper end of this shaft carrying the guiding-handles *g*, by turning which the rear wheel is turned, and the direction of movement of the vehicle changed, as will be readily understood, this guide-shaft being just in front of the perch-saddle *h*, or between the saddle and the wheel *b*.

The wheel *b* turns only in line with the perch, its axle turning in bearings in the end of the fork-arms *i*, which straddle the wheel.

Pivoted on this axle is the crank, or pedal-frame *k*, composed of two similar parts, one on each side of the wheel, and united at their inner ends by a pin, *l*, which also connects and fastens the frame to a bar, *m*, fixed to and projecting down from the perch.

The bar *m* is provided with a series of holes, *n*, by means of which, and the bolt-pin *l*, the frame may be adjusted and fixed in position relatively to the perch.

In each side of the frame *k* is journalled a crank-shaft, *o*, the pedal, or crank-pin *p* of which projects outward from the frame, as seen at B, the crank-shafts and pedals being so located that they may be readily driven by the feet of a bestriding rider.

Now, by setting the pedal-frame more or less distant from the perch, it will be seen that the pedals may be brought into position, to be readily operated by a long or short-legged person, or by a person who prefers to have the pedals nearly in line with the axis of the driving-wheel, or one who prefers to have them dropped towards or near to the ground or floor.

Each crank-shaft carries a gear-wheel, *r*, which meshes into and drives a gear, *s*, fixed on the axis of the leader-wheel, so that alternate rotative motion, imparted to the two cranks by the two feet of the rider, is transmitted through the gears to the leader-wheel, thus giving a forward movement to the vehicle.

At the foot of the adjusting-bar *m* is a brake, *t*, turning on a pin in the end of the bar, the brake having foot-pins, *u*, by means of which either foot, transferred from its pedal-crank, can apply the brake and arrest the machine.

By arranging the foot-driven cranks as shown, it will be obvious that a leader-wheel of great diameter can be practically used, as the cranks can be carried to a considerable distance below the plane of the axle of the wheel.

I claim, in combination with the leader-wheel of a velocipede, whose steering-wheel is in the rear, the frame *k*, adjustable about its axis, and carrying the foot-driven cranks, geared to the main axle, substantially as described.

Also, in combination with the adjusting-bar *m*, the brake *t*, arranged to be operated substantially as described.

P. J. BORIS.

Witnesses:
J. B. CROSBY,
FRANCIS GOULD.